HIGH FIELD SUPERCONDUCTING DEVICES

Filed Sept. 25, 1962 2 Sheets-Sheet 1

INVENTORS V. JACCARINO
M. PETER
BY [signature]
ATTORNEY

May 25, 1965 V. JACCARINO ETAL 3,185,900

HIGH FIELD SUPERCONDUCTING DEVICES

Filed Sept. 25, 1962 2 Sheets-Sheet 2

INVENTORS V. JACCARINO
M. PETER
BY [signature]
ATTORNEY

United States Patent Office 3,185,900
Patented May 25, 1965

3,185,900
HIGH FIELD SUPERCONDUCTING DEVICES

Vincent Jaccarino, Morristown, N.J., and Martin Peter, Geneva, Switzerland, assignors to Bell Telephone Laboratories, Incorporated, New York, N.Y., a corporation of New York Filed Sept. 25, 1962, Ser. No. 226,017
7 Claims. (Cl. 317—158)

This invention relates to superconducting materials and devices incorporating their use.

In recent years, intense interest has arisen in the use of superconductors in various devices, notably low power-high field magnets, low resistance transmission lines, and switching devices such as the cryotron.

While many aspects of the quantum-mechanical theory of superconductivity remain in question, much has been determined about the behavior of specific materials, and certain inherent theoretical limitations have been imposed. For instance, it is well established that magnetic fields uniformly affect superconductivity by suppressing the transition temperature ($T_c$). This effect is a function of field strength and imposes a maximum field value, the critical field ($H_c$), above which superconductivity cannot exist. This maximum field, $H_c$, has recently been theoretically established as a fixed quantity relative to the zero field critical temperature, $T_c$. This relation, called the Clogston Limit and described in Physical Review Letters, September 15, 1962, is the following:

$$H_c \leq 18,400 T_c \qquad (1)$$

where $H_c$ is in gauss and $T_c$ in degrees Kelvin. This relation is proposed as valid for all presently known "hard" superconducting materials. Hard superconductors are those which exhibit incomplete Meissner effect, that is, complete field penetration.

Another accepted fact in this technology is that the presence of localized magnetic electrons in the lattice structure of a material inhibits superconductivity. This is recognized as due to the reduction in free energy of the conduction electrons in the normal state relative to the superconducting state as a result of the internal exchange field produced by the magnetic spin moments. Consequently, the prior art recognizes that ferromagnetic materials generally cannot exhibit superconductivity. Certain exceptional materials are noted in this connection, such as those described in United States Patents Nos. 2,970,961 and 2,989,480, issued February 7, 1961 and June 20, 1961, respectively.

This invention is directed to the unexpected and highly significant discovery that certain magnetic materials which do not normally evidence superconductivity can be rendered superconducting, and by so doing, certain surprising and advantageous results are obtained. These materials are characterized as "negative field" materials. This term implies that the conduction electrons of the material are polarized in an external field in a direction opposite to the field resulting from the spin moments of the magnetic electrons. It is also essential for the purposes of this invention that the conduction electrons of the materials would in the absence of the localized magnetic moments permit the existence of zero resistance at a finite temperature.

According to this invention, a negative field material such as above described, which is not normally superconducting, will exhibit superconductivity upon the application of an external magnetic field. This external field opposes the pre-existing negative internal field and operates to eliminate the effect of the electron spin moments on the conduction electrons.

These and other aspects of this invention may become more apparent from a consideration of the drawing, in which.

Figure 1:
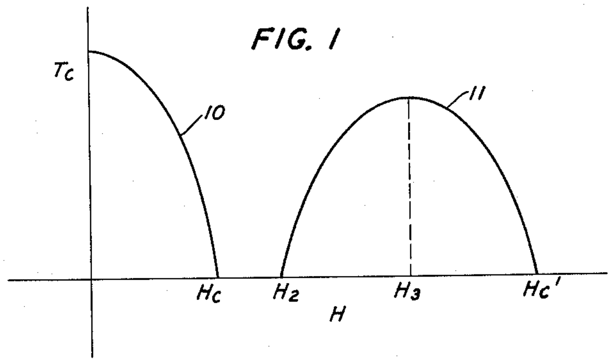
FIG. 1 is a plot of the critical temperature, $T_c$, versus the critical field, $H_c$, for an ordinary superconductor and for a negative field superconductor according to this invention.

Ordinary superconducting materials such as those existing in the prior art invariably show a reduction in their transition temperature as a consequence of applied external magnetic field. A typical curve illustrating this relation is shown at 10 in FIG. 1. In the positive quadrant the $T_c$ versus H curve necessarily possesses a negative slope. This is a fundamental precept of classical superconductivity. If, however, a negative field ferromagnetic material is placed in the influence of an external field, a relationship such as that shown by curve 11 is found. One may consider that the presence of magnetic spins in the lattice of the material adds an internal field which destroys superconductivity, but on the application of an external field the deleterious effect of the spin moments is destroyed, thereby permitting re-establishment of superconductivity. This is illustrated in FIG. 1. The value $H_c$ is the maximum field in which the ordinary superconductor will function and is prescribed in Relation 1. With the magnetic material of curve 11, this field value is just beginning to eliminate the negative internal field caused by the spin moments. At $H_2$ the magnetic material begins to evidence superconductivity and at $H_3$ the negative field is compensated and the maximum $T_c$ is obtained. $H_c'$ is the critical field for the magnetic material. It is appreciated that the critical field for the magnetic material is no longer limited by Relation 1 but can now be increased by a field equal to the negative field of the magnetic material. The internal negative fields vary significantly in magnitude with the electron structure of the material. With certain materials, critical fields of many megagauss are possible.

The recognition of this phenomenon provides a new class of superconducting materials. For instance, the ferromagnetic rare earth elements provide characteristics attractive for this invention. Intermetallic compounds and alloys including members of the rare earth elements are particularly useful. Of this group, compounds of the cubic Laves phase $AB_2$ are exemplary where A is an element selected from elements having atomic numbers from 57 to 71 and B is a superconducting element such as Os, Al, Ir, and Ru. Also attractive are the actinide group metals beginning with actinium and similar cubic Laves phase compounds.

These materials are given as exemplary only of a basic class of materials providing the essential characteristics which permit their use in the devices of this invention. As previously indicated, these characteristics are that the material possess a negative internal field. For the purposes of definition, the average magnetic moment of the magnetic electrons should have a magnitude of at least 0.1 Bohr magneton at a temperature above 1 degree Kelvin. The material should additionally show a finite resistance at 1 degree Kelvin in the absence of an external negative field and possess conduction electrons which permit a zero resistance at a finite temperature in a finite applied external magnetic field. The superconductors described herein and intended as within the scope of this invention must also be "hard" superconductors, that is, those which exhibit complete field penetration. This concept is known in the art and can be found in Superconductivity, by David Shoenberg, Cambridge University Press, Cambridge, England.

Since the materials that possess an electron structure which permits the existence of superconductivity at finite temperatures are characterized by a high density of electron states in the conduction-band, this criterion is used to define the materials falling within the scope of this invention. Accordingly, negative field materials having an electronic heat capacity, $C_v$, meeting the relation $$C_v < 3 \times 10^{-4}\ T \text{ cal./mole deg.} \qquad (2)$$

where T is the temperature, will exhibit a finite resistance at zero field and finite temperature and will become superconducting upon the application of a magnetic field. The useful aspects of this invention are expected to arise when the external field exceeds 50 gauss.

The approximate magnitude of the negative field in certain exemplary compositions is indicated in the following table. In each case, when a sample of the composition designated is cooled to the temperature $T_s$ and subjected to a magnetic field of the strength appearing in the column headed $H_{app}$ the sample will show zero resistance. The resistance measurement may be made by any standard prior art technique.

TABLE I

*Materials suitable for negative field superconductors*

| Materials | $H_{app}$ | $T_s$, °K. |
|---|---|---|
| $GdOs_2$ | $300-400 \times 10^3$ | <6 |
| $TbOs_2$ | $250-350 \times 10^3$ | <6 |
| $DyOs_2$ | $200-300 \times 10^3$ | <6 |
| $HoOs_2$ | $150-250 \times 10^3$ | <6 |
| $ErOs_2$ | $100-200 \times 10^3$ | <6 |
| $TmOs_2$ | $50-150 \times 10^3$ | <6 |
| $YbOs_2$ | $10-100 \times 10^3$ | <6 |
| $GdRu_2$ | $900-1000 \times 10^3$ | <1.7 |
| $TbRu_2$ | $800-9000 \times 10^3$ | <1.7 |
| $DyRu_2$ | $650-800 \times 10^3$ | <1.7 |
| $HoRu_2$ | $500-700 \times 10^3$ | <1.7 |
| $ErRu_2$ | $300-500 \times 10^3$ | <1.7 |
| $TmRu_2$ | $300-500 \times 10^3$ | <1.7 |
| $YbRu_2$ | $300-500 \times 10^3$ | <1.7 |

The low field superconductors can be measured using standard equipment. In the extremely high field materials the negative field value can be obtained using nuclear magnetic resonance studies and electron paramagnetic resonance measurements. See Physical Review Letters, 5, 221 (1960).

All of the specific materials mentioned in this specification are known to exhibit a finite zero field resistance at cryogenic temperatures. This is characteristic of ferromagnetic materials.

Figure 2:
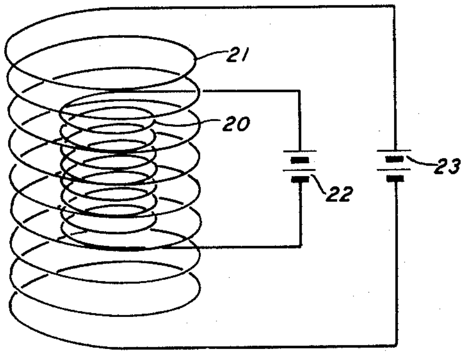
FIG. 2 is a perspective view of a simple device configuration embodying the invention.

Various device applications can be proposed utilizing the superconducting mechanism of this invention. A simple such arrangement is shown in FIG. 2. This figure shows two coils 20 and 21 with associated power supplies 22 and 23. The external coil 21 consists of a conventional superconducting composition such as $Nb_3Sn$. This coil is energized and is capable of field values of the order of 100 kilogauss or more (the limiting critical field is in excess of 300 kilogauss). The internal coil 20 consists of a material meeting the prescriptions of this invention, that is, it possesses a negative field and satisfies Relationship 2. The second coil will not be superconducting in the absence of the field produced by coil 21. The field produced by coil 21 may be thought of as a bias field and is chosen in magnitude to overcome the negative field of the material of coil 20. Assuming coil 21 creates a field having a value of 50 kilogauss, an appropriate material for coil 20 can be chosen from Table I. For instance, either $TmOs_2$ or $YbOs_2$ will become superconducting in this field.

The source 23 can then be energized to further elevate the field value. Both coils are maintained at a temperature below 6 degrees Kelvin. Devices having this basic structure are useful for achieving high field values, in magnetic or electric storage elements, as field actuated switches and for various other applications which will become apparent to those skilled in the art.

Figure 4:
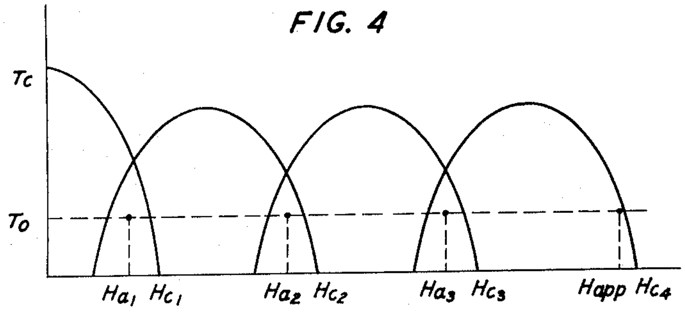
FIG. 4 is a plot of the impressed magnetic field, H, versus the critical temperature, $T_c$, illustrating the operation of the device of FIG. 3.
Figure 3:
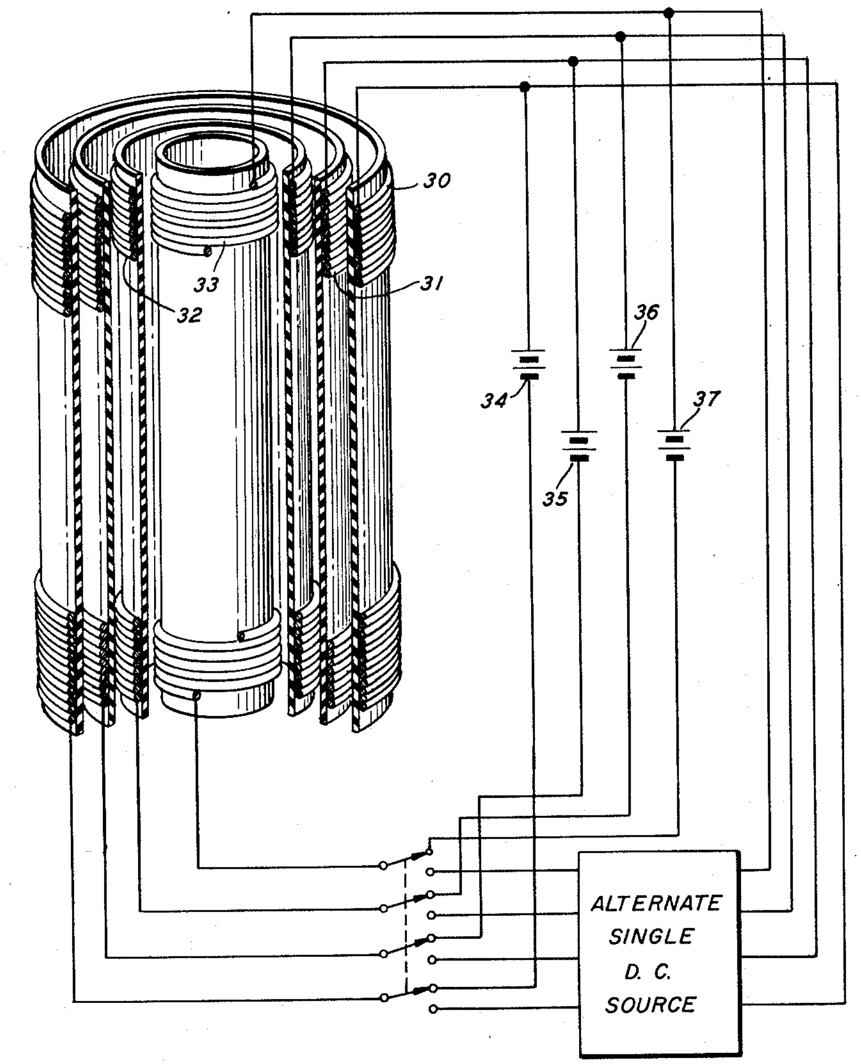
FIG. 3 is a perspective view of a preferred device configuration according to the invention.

FIG. 3 shows a more elaborate arrangement which is designed primarily for obtaining high fields. Here four concentric coils 30, 31, 32, and 33 are arranged so that each is influenced by a "bias" coil. The coils produce sequentially higher fields in stages each beginning around the negative field value and increasing to the critical field. It is desirable that each coil have an independent associated power supply, 34, 35, 36, and 37, although a single power source may be appropriate in some constructions. Each coil is chosen of a material which is capable of superconductivity in the influence of the field of the previous coil and is capable of producing a field of higher strength. Again, the first stage, coil 30, consists of a conventional superconductor. Choosing the first coil, 30, and applying the necessary current from supply 34 such that the first stage reaches a field value of 100 kilogauss, the remaining coils 31–33 can be chosen from Table I. Coil 31 is appropriately $TmOs_2$, producing a field of 150 kilogauss. Coil 32 may be $ErOs_2$, achieving a field of 200 kilogauss. Coil 34 is advantageously $HoOs_2$, giving an ultimate field for the composite device of 250 kilogauss. The respective power supplies associated with each coil are adjusted to give the proper operating field value as indicated schematically in FIG. 4 by $H_{a1}$, $H_{a2}$, $H_{a3}$, with the ultimate maximum operating field indicated by $H_{app}$. Each coil must be maintained at a superconducting temperature which is conveniently the same for all coils as indicated in the figure by $T_0$.

The particular values for $H_2$ in FIG. 1 which must be exceeded to achieve superconductivity in the negative field material can be predicted approximately from the Clogston limit given in Relation 1. This follows since the curve 11 is approximately symmetrical about the maxima and $H_c'$ equals $H_3$+Clogston limit. Accordingly, in the device of this invention the bias field for a given negative field superconducting element must exceed the value $H_E$ where $$H_E = H_N - 18{,}400 T_c \qquad (3)$$

where $H_N$ is the negative field value and $T_c$ is the transition temperature for the material.

Whereas the FIGS. 2 and 3 suggest the continual presence of the "bias" field, it is not essential to the continued operation of the negative field coil. That is, the interior coils may be made self-sustaining if the current density necessary for the bias field value is obtained. The magnitude of the field follows the standard Biot-Savart law.

This arrangement and the specific materials suggested are exemplary only. Various other device configurations utilizing the principles of operation as taught by this invention can be constructed. For instance, switching devices analogous to the cryotron are particularly attractive. In such devices and memory elements the superconducting element would not of necessity be a coil but may be merely a straight conductor. Also materials other than those specifically enumerated herein which exhibit the essential characteristics prescribed will be useful in this construction. It should be mentioned in this connection that any desired negative field value may be obtained by proper selection of the material. For instance, alloys of the compounds of Table I with themselves and other rare earth compounds will exhibit different negative fields. Also dilution of conventional superconductors with rare earth elements and compounds give further choice of negative field values.

What is claimed is:

1. A superconducting device comprising a negative field material permitting complete magnetic field penetration and having an electronic specific heat, $C_v$, given by the formula:

$$C_v < 3 \times 10^{-4} \text{ T cal./mole degrees}$$

where T is the temperature in degrees K. and which material exhibits a finite resistance at 1° K., means associated with said material for subjecting it to the influence of a magnetic field H given by the relation:

$$H > H_N - 18400 T_c$$

where $H_N$ is the negative field value and $T_c$ is the transition temperature of the material and cryogenic means for maintaining the negative field material below its transition temperature.

2. The device of claim 1 wherein the said material is an element selected from the elements having atomic numbers 57–71 and 89–92.

3. The device of claim 1 wherein the said material is a cubic Laves phase material having the formula $$AB_2$$

where A is selected from the elements having atomic numbers 57–71 and 89–92 and mixtures thereof and B is selected from the group consisting of osmium, iridium, aluminum and ruthenium and mixtures thereof.

4. A high field superconducting magnet comprising a plurality of concentrically disposed coils each coil being electrically connected to a current supply and consisting of a material having an electronic specific heat, $C_v$, given by the formula:

$$C_v < 3 \times 10^{-4} \text{ T cal./mole degrees}$$

where T is the temperature in degrees K. and which materials exhibit a finite resistance at 1° K., means associated with the outermost of said plurality of coils for imposing a magnetic field on said coil said field having a magnitude H expressed by the relation:

$$H > H_N - 18{,}400 T_c$$

where $H_N$ is the negative field value and $T_c$ is the transition temperature of the material, current source means electrically connected to each of said plurality of coils for generating a magnetic field in each coil which has a value exceeding the said H value for the next succeeding internal coil and cryogenic means for maintaining each of said coils below the superconducting transition temperature.

5. The device of claim 4 wherein the current sources are separate.

6. The device of claim 4 wherein the current source is a single supply with the coils connected in series.

7. The device of claim 4 wherein the current source means is adapted to generate a field in each coil which exceeds the negative field value of the next successive internal coil.

No references cited.

JOHN F. BURNS, *Primary Examiner.*